United States Patent [19]
Urbanek

[11] Patent Number: 4,789,232
[45] Date of Patent: Dec. 6, 1988

[54] BREAK-AWAY PIVOT SYSTEM FOR REARVIEW MIRRORS

[75] Inventor: Karel Urbanek, Weston, Canada

[73] Assignee: Dominion Automotive Industries Inc., Toronto, Canada

[21] Appl. No.: 85,145

[22] Filed: Aug. 14, 1987

[51] Int. Cl.$^4$ ............................ B60R 1/06; G02B 7/18
[52] U.S. Cl. ...................................... 350/632; 350/604;
248/900; 248/475.1
[58] Field of Search ..................... 350/604, 632, 631;
248/900, 549, 477, 475.1, 476

[56] References Cited

U.S. PATENT DOCUMENTS 4,606,619 8/1986 Yamana .............................. 350/604

FOREIGN PATENT DOCUMENTS

| 558213 | 9/1954 | Canada | 248/475 B |
|---|---|---|---|
| 1240429 | 5/1967 | Fed. Rep. of Germany | 248/475 B |
| 3248759 | 7/1984 | Fed. Rep. of Germany | 350/632 |
| 1208119 | 2/1960 | France | 248/900 |
| 658679 | 10/1951 | United Kingdom | 350/604 |
| 746366 | 3/1956 | United Kingdom | 248/900 |
| 848705 | 9/1960 | United Kingdom | 248/900 |
| 854884 | 11/1960 | United Kingdom | 248/900 |
| 965817 | 8/1964 | United Kingdom | 248/900 |
| 2053112 | 2/1981 | United Kingdom | 248/900 |

Primary Examiner—Jon W. Henry
Attorney, Agent, or Firm—Shoemaker and Mattare, Ltd.

[57] ABSTRACT

A break-away mounting for vehicle-mounted mirrors includes a mounting member for securing to the side exterior of a vehicle, with a portion projecting outwardly from the vehicle. A mirror support receives a mirror and has a pivot boss where the mirror support can be pivotally mounted to the portion of the mounting member. A follower guide is secured to either the portion or pivot boss and a follower is mounted in the guide. Cam surfaces are provided on the other of the portion and boss, and a resilient spring urges the follower against the cam surface. The cam surface defines firstly a detent or recess for receiving the cam follower when the mirror support is in its normal operating position, and further defines sloping cam surfaces to either side of the recess which are such that when the mirror support is deflected forwardly or rearwardly it automatically returns to its normal position.

6 Claims, 4 Drawing Sheets

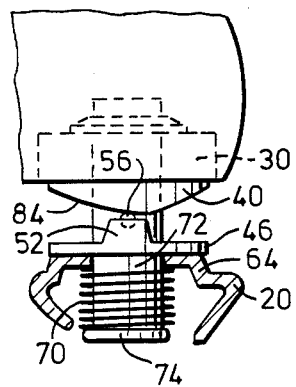
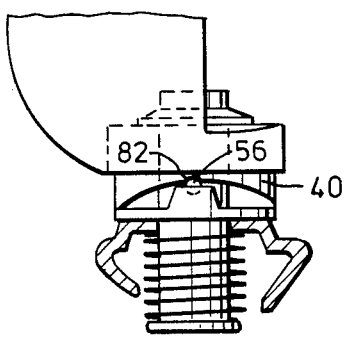
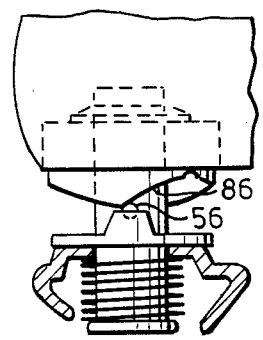
FIG. 3　　　FIG. 4　　　FIG. 5
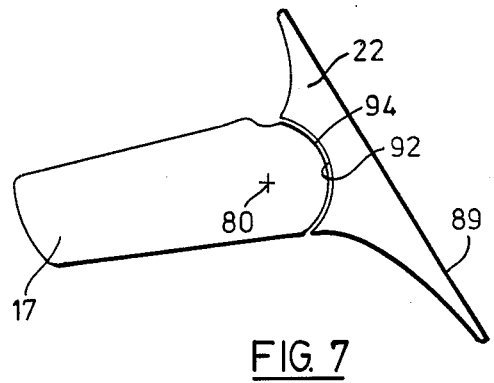
FIG. 7
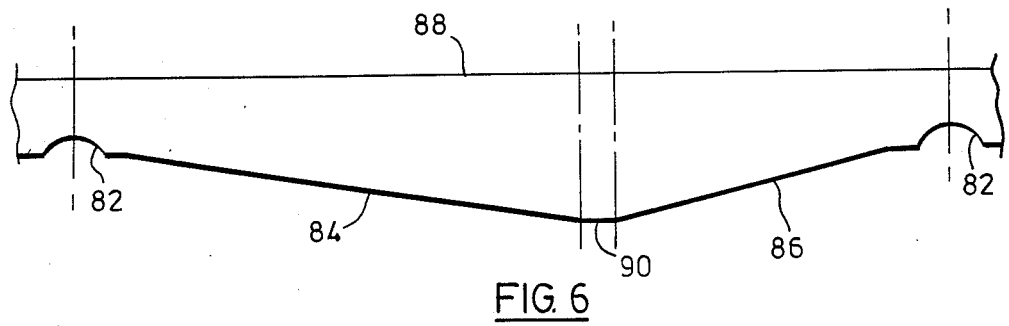
FIG. 6

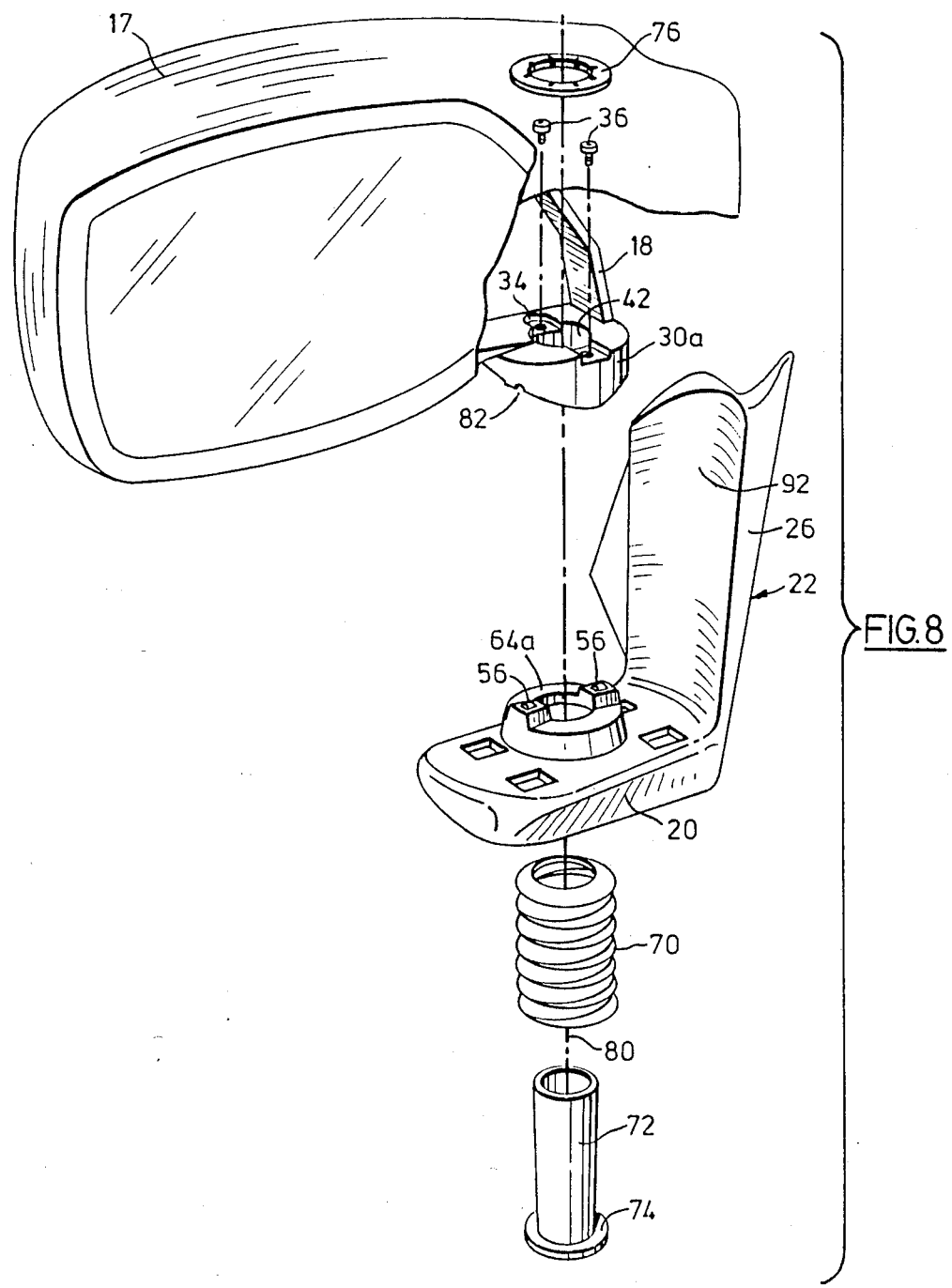

BREAK-AWAY PIVOT SYSTEM FOR REARVIEW MIRRORS

This invention relates generally to outside rearview mirrors for vehicles such as trucks, automobiles and the like, and has to do particularly with a break-away pivot system for such mirrors.

BACKGROUND OF THIS INVENTION

Existing break-away systems for rearview mirrors are usually of one of two types:

1. Those based on the double hinge principle, centred by a large tension spring attached to the door mounting feature at one end and to the mirror housing at the other. These constructions will generally self-centre whether they are deflected in the forward or rearward directions.

2. Those with a central pivot system having one or more detents. The detent means is usually provided by a raised feature on one element and a cavity in the mating element. The mating surfaces are generally in a plane normal to the pivot axis.

Generally speaking, it would be desirable to provide a construction which does away with the conspicuous and unsightly tension spring mentioned under the first of the above two types, while still allowing the construction to self-centre after it is deflected away from its normal operating position.

GENERAL DESCRIPTION OF THIS INVENTION

It is an aspect of this invention to provide a break-away pivot surface for a rearview mirror which will accomplish the objective just defined.

More particularly, this invention provides a break-away mounting for vehicle-mounted mirrors, comprising:

a mounting member adapted to be secured to the side exterior of a vehicle, a portion of said mounting member projecting outwardly from the vehicle when the mounting member is secured thereto, a mirror support adapted to receive and support a mirror, a pivot boss forming part of said mirror support, pivot means pivotally mounting said pivot boss to said portion such that the mirror support can pivot with respect to the portion about an axis which is oriented substantially vertically when the mounting member is secured to the vehicle, a guide ring affixed to one of said portion and said pivot boss, the guide ring defining two diametrically opposed recesses, a roller bearing in each of the recesses, and cam means on the other of said portion and said pivot boss, the cam means operatively interacting with said roller bearings, resilient means urging said roller bearings against the cam means, the cam means defining detent means for receiving the roller bearings when the mirror support is in that position with respect to the mounting member which corresponds to normal vehicle operation, the cam means further defining sloping cam surfaces to either side of each detent means which are such that when the mirror support is deflected either forwardly or rearwardly with respect to the vehicle, it automatically returns to the position which corresponds to normal vehicle operation, the said cam surfaces including, for each detent means:

(a) a first cam surface contacted by the corresponding roller bearing when the mirror support is deflected forwardly, (b) and a second cam surface contacted by the corresponding roller bearing when the mirror support is deflected rearwardly, the said cam surfaces extending within a common annulus around the said axis, all cam surfaces defining with a plane normal to said axis an angle large enough to ensure that friction will not retain the roller bearings at any position along them, whereby when the mirror support is moved to a forward or a rearward position with respect to its normal operating position, it will tend to be returned to its normal operating position by camming action in cooperation with said resilient means.

GENERAL DESCRIPTION OF THE DRAWINGS

Two embodiments of this invention are illustrated in the accompanying drawings, in which like numerals denote like parts throughout the several views, and in which:

FIGS. 3, 4 and 5 illustrate three different angular rotation positions of the mirror with respect to the main mounting, seen partly in section and partly in elevation;

FIG. 6 is a developed schematic view showing the difference in slope of the two cam surfaces utilized in this invention;

FIG. 7 is a top plan view of the basic assembly, seen to a smaller scale; and

FIG. 8 is a perspective, partly broken away, exploded view of the various components of the second embodiment of the structure to which this invention is directed.

DETAILED DESCRIPTION OF THE DRAWINGS

Figure 1:
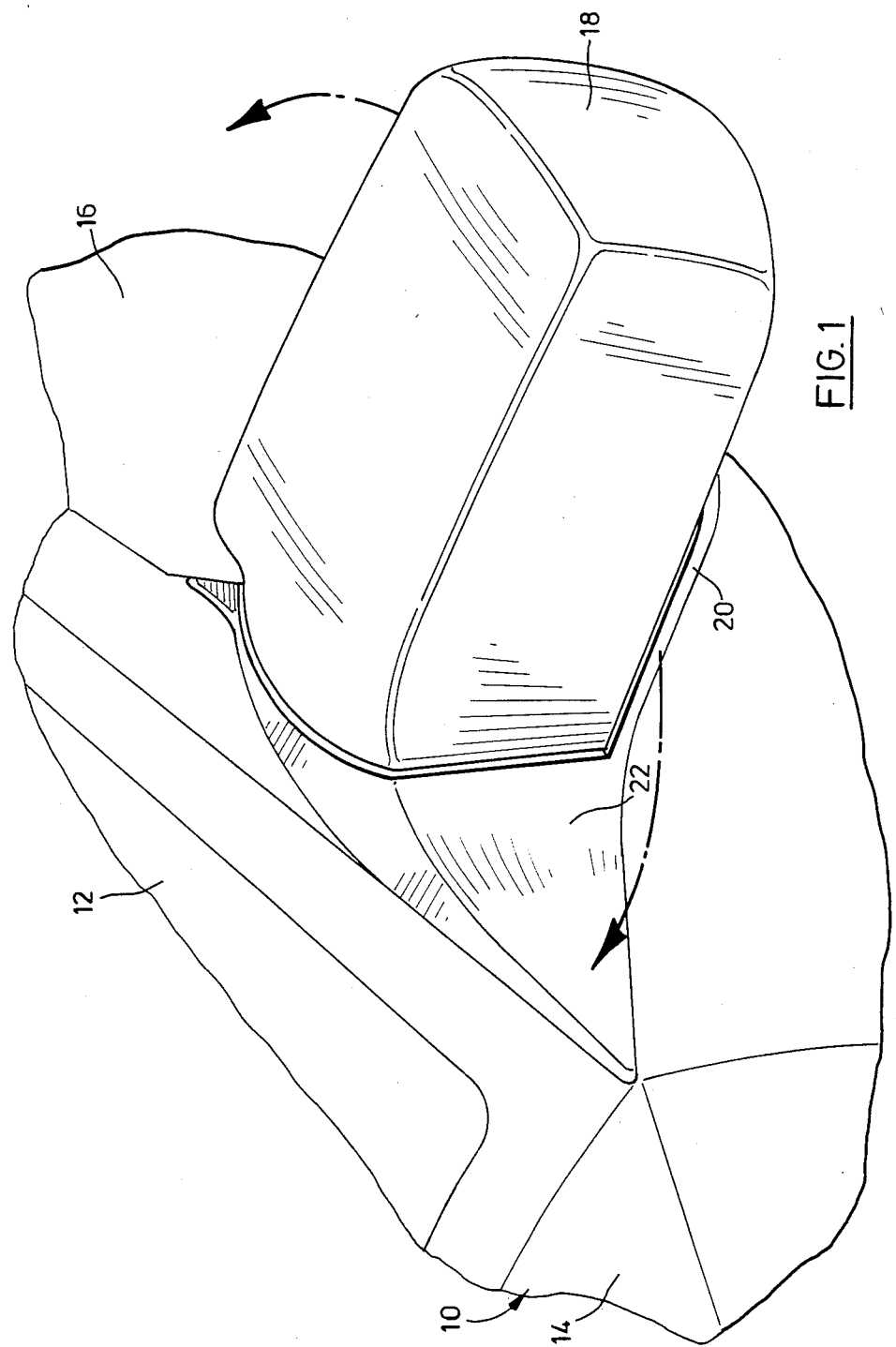
FIG. 1 is a partial perspective view of a portion of a vehicle, showing a complete rearview mirror mounted externally of the vehicle, and constructed in accordance with this invention.

Attention is first directed to FIG. 1 which shows part of a vehicle 10 to include the front windshield 12, the hood 14, and a side door 16.

A mirror housing 17 is constructed to enclose the mirror (the mirror not being seen in FIG. 1). The mirror housing 17 is secured to an internal frame 18 which is pivotally mounted to a portion 20 of a mounting member 22 which is in turn secured to the side exterior of the vehicle 10.

Figure 2:
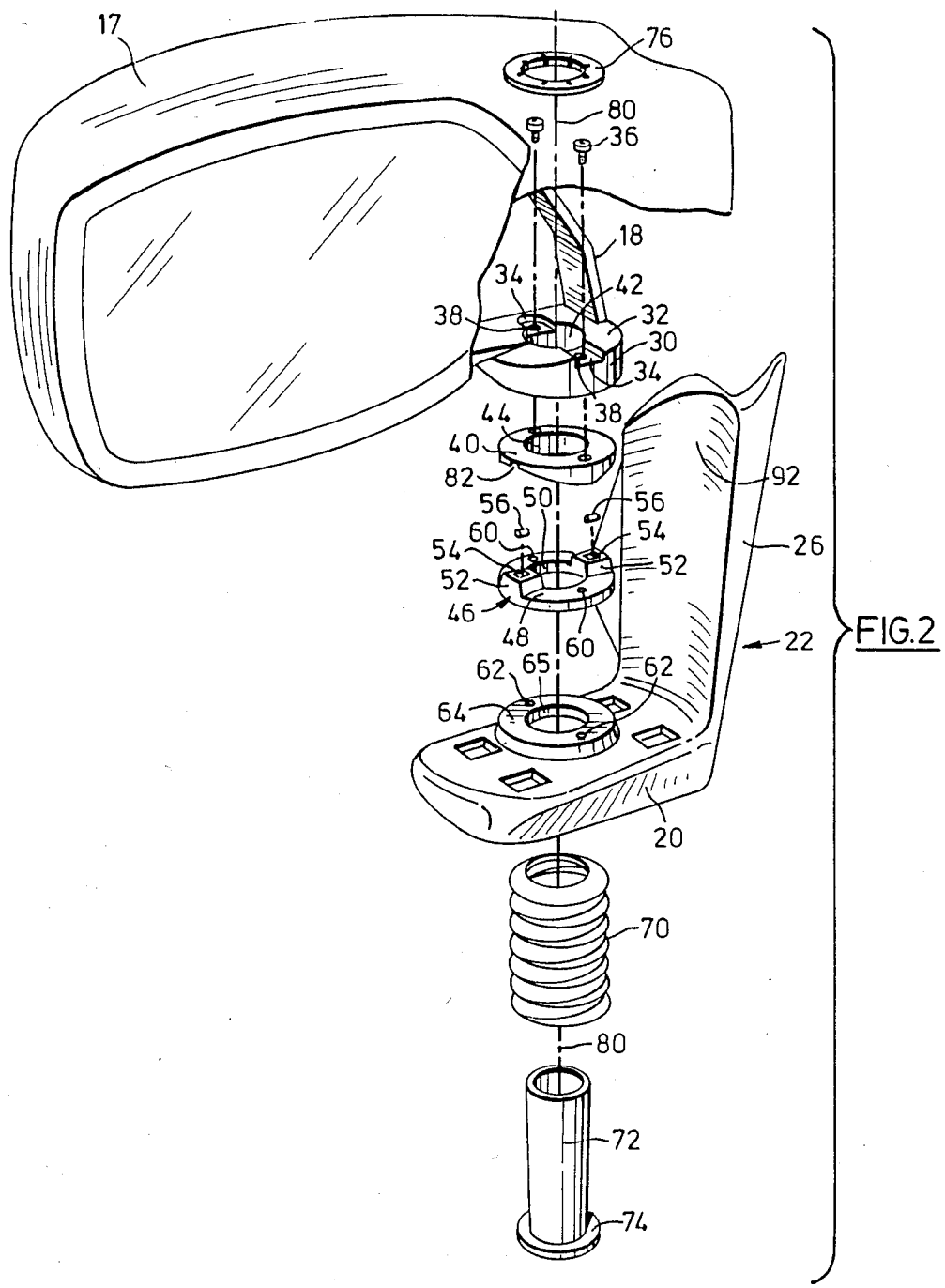
FIG. 2 is a perspective, partly broken away, exploded view of the various components of the first embodiment of the structure to which this invention is directed.

Attention is now directed to FIG. 2 for a more detailed description of the first embodiment.

The mirror housing 17 encloses and houses a mirror 24 of the usual kind, which may be fixed in place with respect to the housing 17 or capable of minor angular adjustment in known fashion.

The mounting member 22 has a securement portion 26 which is contoured and shaped in such a way as to adapt itself to the particular vehicle with which it is intended to be used. The portion 20 of the mounting member 22 projects outwardly from the vehicle when the mounting member 22 is secured to the vehicle, and thus takes up a substantially horizontal position in the mounted condition.

A pivot boss 30 forms part of the mirror support frame 18, and is seen to include, in its top wall 32, two recesses 34 which make allowance for the heads of two machine screws 36 adapted to pass through bores 38 provided in the boss 30. The machine screws 36 secure, against the bottom surface of the boss 30, a cam-defining member 40. The boss 30 has a central cylindrical opening 42 which registers axially with a similar opening 44 in the member 40 when the member 40 is in place against the boss 30. The shape of the underside of the cam-defining member 40 will be described subsequently with respect to FIGS. 3-6.

A guide ring 46 is provided, this member including a flat annular portion 48 surrounding a central cylindrical opening 50, and having two integral raised portions 52 at diametrically opposed locations about the axis of the operation 50, each raised portion 52 defining an upwardly open recess 54 in which a cylindrical roller bearing element 56 can be received. Bores 60 are provided in the portion 48 of the guide ring 46 through which machine screws (not shown) can pass and engage threaded bores 62 in a raised annular portion 64 integral with the portion 20 of the mounting member 22, in order to hold the guide ring 46 securely in position against the portion 20.

In order to resiliently urge the various parts together, specifically the mirror support with the cam-defining member 40 downwardly against the portion 20 of the mounting member 22 (to which the guide ring 46 is secured), there is provided resilient means which includes a compression coil spring 70 and a sleeve 72 having an outwardly projecting flange 74 at the lower end as pictured in FIG. 2. A clamp washer 76 is provided to engage the uppermost end of the sleeve 72 after it has been passed through a central opening 65 in the raised portion 64, the opening 50 in the guide ring 46, the opening 44 in the cam-defining member 40 and the opening 42 in the boss 30.

It has been explained at the beginning of this disclosure that what is desired is for the mirror housing 17 to return to its normal operating position whenever it is deflected away from the normal operating position. This is accomplished by ensuring that the lower surface of the member 40 defines particular camming surfaces with particular slopes. More specifically, FIG. 6 shows a development of one half of the camming surface under the member 40. It will be understood that the camming surfaces under the member 40 extend within a common annulus around an axis 80 which may be defined as the pivot axis (see FIG. 2).

Returning again to FIG. 6, it is firstly to be pointed out that the cam arrangement defines two recess or detent means 82 for receiving the cam followers (the roller bearing elements 56) when the mirror support 18 is in that position with respect to the mounting member 22 which corresponds to normal vehicle operation. The recesses 82 are diametrically opposed on the cam-defining member, and one of these recesses can be seen in FIG. 2. It is pointed out again that the cam surfaces are wrapped around the axis 80 somewhat in the manner of a cylinder, and that by "developing" the surfaces as in FIG. 6, they are opened out to lie in a flat plane. This is the reason why FIG. 6 can show both of the recesses 82, even though in actuality the recesses are diametrically opposed to each other on the member 40. Taking the leftward recess 82 in FIG. 6, it can be seen that, to the right of this recess, there is a gradually sloping cam surface 84, whereas to the left of the other (rightward) recess 82, there is a more steeply sloping cam surface 86. Since FIG. 6 shows only one half of the total camming surface, it will be appreciated that, for each recess 82, there is a steep camming surface 86 to the left and a more gentle camming surface 84 to the right. Each camming surface 84 and 86 is such that it defines with a plane normal to the axis 80 (which may be taken to be represented by the line 88 in FIG. 6) an angle small enough to ensure that friction will not retain the bearing element at any position along the surface, so that when the mirror support is moved to a forward or rearward position with respect to its normal operating position, it will tend to be returned to its normal operating position by camming action in cooperation with the spring 70.

The reason for the different slopes in the surfaces 86 and 84 relates to the fact that the housing 17 does not project at right angles from the general extent of the mounting member 22 or the side surface of a vehicle to which the mirror is mounted. Looking at FIG. 7, it will be seen that the housing 17 is raked forwardly with respect to the inside surface 89 of the mounting member 22. Due to this forward application, the degree to which the housing 17 can be deflected forwardly (clockwise in FIG. 7) from the normal operating position is substantially less than the degree to which it can be deflected rearwardly. This fact, taken together with the desirability of providing a flat region 90 between the camming surfaces 84 and 86 (see FIG. 6) requires that the camming surfaces have different slopes. The purpose of the flat region 90 is simply to provide a portion on the camming surfaces which is such that the cam follower rollers 54 can reach and remain at the portion 90 upon sufficient deflection of the mirror support from its normal operating position.

Further examination of FIG. 7 will reveal that the mirror support 22 provides a cylindrically concave surface 92, which is complementary with a cylindrically convex surface 94 of the housing 17. Both surfaces 92 and 94 are concentric with the pivot axis 80 of movement between the housing 17 and the support 22. It is particularly desirable to ensure that the concentric surfaces 92 and 94 are closely fitting, because this minimizes the risk that fingers or other items can become entrapped or lodged between the surfaces when the housing 17 is moved with respect to the mounting member 22. The close fit between surfaces 92 and 94 is also desirable from an aesthetic point of view, and further because it tends to reduce wind noise.

Attention is now directed to FIGS. 3, 4 and 5, for a more detailed description of the operation of this structure.

FIG. 4 shows the various portions when the mirror housing 17 is in the normal operating position. Each bearing element 56 is received in its respective recess 82.

FIG. 3 shows the situation when the mirror support has been moved to a forward position, with the bearing element 56 located along the more gradual cam surface 84.

FIG. 5 shows the condition when the mirror housing 17 has been moved rearwardly from its normal operating position. The bearing element 56 is resting against the relatively steeper camming surface 86. Regardless of which way the mirror housing 17 has been moved, the resilient action of the spring 70 will return it to its normal operating position.

A second embodiment of this invention is shown in FIG. 8, in which all portions are similar to those shown in FIG. 2 with the exception that the boss 30a now integrally incorporates the cam defining member (shown as 40 in FIG. 2), and the raised annular portion 64a in FIG. 8 integrally incorporates the item shown as the guide ring 46 in FIG. 2. The remaining portions, and the operation of the device, remain the same.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A break-away mounting for vehicle-mounted mirrors, comprising:
   a mounting member adapted to be secured to the side exterior of a vehicle,
   a portion of said mounting member projecting outwardly from the vehicle when the mounting member is secured thereto,
   a mirror support adapted to receive and support a mirror,
   a pivot boss forming part of said mirror support,
   pivot means pivotally mounting said pivot boss to said portion such that the mirror support can pivot with respect to the portion about an axis which is oriented substantially vertically when the mounting member is secured to the vehicle,
   a guide ring affixed to one of said portion and said pivot boss, the guide ring having a generally planar upper sirface including two integral raised portions at diametrically opposed positions - has been inserted. defining two diametrically opposed recesses, a roller bearing in each of the recesses,
   and cam means on the other of said portion and said pivot boss, the cam means operatively interacting with said roller bearings,,
   resilient means urging said roller bearings against the cam means,
   the cam means defining detent means for receiving the roller bearings when the mirror support is in that position with respect to the mounting member which corresponds to normal vehicle operation,
   the cam means further defining sloping cam surfaces to either side of each detent means which are such that when the mirror support is deflected either forwardly or rearwardly with respect to the vehicle, it automatically returns to the position which corresponds to normal vehicle operation,
   the said cam surfaces including, for each detent means:
   (a) a first cam surface contacted by the corresponding roller bearing when the mirror support is deflected forwardly,
   (b) and a second cam surface contacted by the corresponding roller bearing when the mirror support is deflected rearwardly,
   the said cam surfaces extending within a common annulus around the said axis,
   all cam surfaces defining with a plane normal to said axis an angle large enough to ensure that friction will not retain the roller bearings at any position along them, whereby when the mirror support is moved to a forward or a rearward position with respect to its normal operating position, it will tend to be returned to its normal operating position by camming action in cooperation with said resilient means.

2. The invention claimed in claim 1, in which the guide ring is affixed to said portion, and the cam means is affixed to said pivot boss.

3. The invention claimed in claim 1, in which the resilient means includes a compression coil spring.

4. The invention claimed in claim 2, in which the resilient means includes a compression coil spring.

5. The invention claimed in claim 1, in which the cam means defines a portion between the sloping cam surfaces, such that the roller bearings can reach and remain at said portion upon sufficient deflection of the mirror support from its normal operating position.

6. The invention claimed in claim 4, in which the cam means defines a portion between the sloping cam surfaces, such that the roller bearings can reach and remain at said portion upon sufficient deflection of the mirror support from its normal operating position.

* * * * *